(12) United States Patent
Wiesner et al.

(10) Patent No.: US 8,940,224 B2
(45) Date of Patent: Jan. 27, 2015

(54) THERMALLY STABLE CRYSTALLINE MESOPOROUS METAL OXIDES WITH SUBSTANTIALLY UNIFORM PORES

(75) Inventors: Ulrich Wiesner, Ithaca, NY (US); Mahendra Christopher Orilall, Vancouver (CA); Jinwoo Lee, Kyungbuk (KR); Francis J. DiSalvo, Jr., Ithaca, NY (US)

(73) Assignee: Cornell University, Ithaca, NY (US)

( * ) Notice: Subject to any disclaimer, the term of this patent is extended or adjusted under 35 U.S.C. 154(b) by 633 days.

(21) Appl. No.: 12/747,649

(22) PCT Filed: Dec. 12, 2008

(86) PCT No.: PCT/US2008/086500
§ 371 (c)(1),
(2), (4) Date: Sep. 13, 2010

(87) PCT Pub. No.: WO2009/079346
PCT Pub. Date: Jun. 25, 2009

(65) Prior Publication Data
US 2011/0027572 A1 Feb. 3, 2011

Related U.S. Application Data

(60) Provisional application No. 61/007,664, filed on Dec. 14, 2007.

(51) Int. Cl.
*B28B 1/14* (2006.01)
*C01G 23/053* (2006.01)
(Continued)

(52) U.S. Cl.
CPC ............ *C01G 23/0536* (2013.01); *C01B 13/18* (2013.01); *C01G 1/02* (2013.01); *C01G 23/047* (2013.01); *C01G 23/053* (2013.01);
(Continued)

(58) Field of Classification Search
CPC .......................................................... B28B 1/14
USPC .......................................................... 264/662
See application file for complete search history.

(56) References Cited

U.S. PATENT DOCUMENTS

| 2005/0036931 A1 | 2/2005 | Garcia et al. |
| 2005/0084444 A1 | 4/2005 | Domen et al. |
| 2007/0256978 A1 | 11/2007 | Stucky et al. |

OTHER PUBLICATIONS

International Bureau of the Patent Cooperation Treaty Office, International Preliminary Report on Patentability, mailed Jun. 24, 2010, 8 pgs.

*Primary Examiner* — Joseph S Del Sole
*Assistant Examiner* — Russell Kemmerle, III
(74) *Attorney, Agent, or Firm* — Harris Beach PLLC (57) ABSTRACT

Highly crystalline metal oxide-carbon composites, as precursors to thermally stable mesoporous metal oxides, are coated with a layer of amorphous carbon. Using a 'one-pot' method, highly crystalline metal oxide-carbon composites are converted to thermally stable mesoporous metal oxides, having highly crystalline mesopore walls, without causing the concomitant collapse of the mesostructure. The 'one-pot' method uses block copolymers with an sp or sp 2 hybridized carbon containing hydrophobic block as structure directing agents which converts to a sturdy, amorphous carbon material under appropriate heating conditions, providing an in-situ rigid support which maintains the pores of the oxides intact while crystallizing at temperatures as high as 1000 deg C. A highly crystalline metal oxide-carbon composite can be heated to produce a thermally stable mesoporous metal oxide consisting of a single polymorph.

19 Claims, 9 Drawing Sheets

HEXAGONALLY ARRANGED POLYMER-METAL OXIDE HYBRID → ARGON → HIGHLY CRYSTALLINE METAL OXIDE-CARBON COMPOSITE → AIR → THERMALLY STABLE MESOPOROUS METAL OXIDE (51) Int. Cl.
*C01B 13/18* (2006.01)
*C01G 1/02* (2006.01)
*C01G 23/047* (2006.01)
*C01G 33/00* (2006.01)
*C04B 35/45* (2006.01)
*C04B 38/06* (2006.01)
*C04B 111/00* (2006.01)

(52) U.S. Cl.
CPC ............... *C01G 33/00* (2013.01); *C04B 35/45* (2013.01); *C04B 38/062* (2013.01); *C01P 2002/88* (2013.01); *C01P 2004/04* (2013.01); *C01P 2006/12* (2013.01); *C01P 2006/14* (2013.01); *C01P 2006/17* (2013.01); *C01P 2006/40* (2013.01); *C04B 2111/0081* (2013.01)
USPC .......................................................... 264/662

| HKL | 2 THETA | DOMAIN SIZE (nm) |
|---|---|---|
| 0.0.1 | 22.68 | 35.23 |
| 1.0.0 | 28.54 | 14.33 |
| 1.0.1 | 36.66 | 16.31 |
| 0.0.2 | 46.25 | 27.34 |
| 1.1.0 | 50.7 | 7.03 |
| 1.0.2 | 55.26 | 13.52 |
| 1.1.1 | 56.14 | 9.19 |
| 2.0.0 | 58.74 | 11.31 |

FIG.8

| SAMPLE | BET SURFACE AREA $(m^2/g)$ | PORE VOLUME $(cm^3/g)$ |
|---|---|---|
| $TiO_2$-CASH | 89 | 0.23 |
| $TiO_2$-400air | 107 | 0.24 |
| $TiO_2$-400air-700Ar | 16 | 0.09 |
| $TiO_2$-400air-700Ar | 17 | 0.09 |

THERMALLY STABLE CRYSTALLINE MESOPOROUS METAL OXIDES WITH SUBSTANTIALLY UNIFORM PORES

STATEMENT REGARDING FEDERALLY SPONSORED RESEARCH OR DEVELOPMENT

The Department of Energy has certain rights in this invention pursuant to contract number DE-FG02 87ER45298 between the Department of Energy and Cornell University.

CROSS REFERENCE TO RELATED APPLICATIONS

This application is a national stage application under 35 U.S.C. §371 of PCT Application No. PCT/US2008/086500, filed Dec. 12, 2008, which claims priority to and the benefit of U.S. provisional patent application Ser. No. 61/007,664, filed Dec. 14, 2007 which application is incorporated herein in its entirety by reference.

TECHNICAL FIELD

The present invention relates generally to highly crystalline metal oxide-carbon composite materials and methods for the direct one-pot synthesis of the same. The present invention also relates to thermally stable mesoporous metal oxide materials and methods for the direct one-pot synthesis of the same from highly crystalline metal oxide-carbon composite materials.

BACKGROUND OF THE INVENTION

Many applications, including power generation and energy conversion, necessitate high crystallinity and controlled mesoporosity in the production of metal oxide materials. For instance, highly crystalline mesoporous materials with a transition metal oxide framework have immense potential for applications such as catalysis, photocatalysis, sensors, and electrode materials—because of their characteristic catalytic, optical, and electronic properties. With respect to these and other applications, the usefulness of mesoporous materials can only be maximized if they can be produced in a highly crystalline state. For example, when a material composed of mesoporous titanium dioxide is incorporated into a photocatalysis device, any amorphous regions that are present in the material will reduce the device's efficiency by providing trap sites where the recombination of photo-excited electrons and holes may take place (Ohtani, B., Ogawa, Y. & Nishimoto, S. J. Photocatalytic Activity of Amorphous-Anatase Mixture of Titanium (IV) Oxide Particles Suspended in Aqueous Solutions. Phys. Chem. B. 101, 3746 (1997)). Consequently, it is desirable to synthesize highly crystalline mesoporous titanium dioxide for use in photocatalysis applications. High thermal and mechanical stability are other advantages associated with materials produced in a highly crystalline form. Unsurprisingly, then, the synthesis of organized mesoporous materials has stimulated extensive research over the last decade. Despite many efforts, it remains a major challenge to successfully convert the amorphous walls of the organized mesoporous materials (i.e., the "as-made materials") to crystalline walls during the crystallization process; while simultaneously retaining the original mesostructure. But even after a decade or so of research the direct synthesis of highly crystalline mesoporous metal oxides that are thermally stable and well-ordered still constitutes a major challenge. The conventional processes for preparing crystalline mesoporous metal oxides are: soft templating and hard templating.

Soft templating utilizes soft organic materials, such as block copolymers, to structure direct metal oxides into organic-inorganic hybrids. The unlike blocks in block copolymers tend to phase separate into microdomains forming different mesophases. The size scale of the domains is governed by the chain dimensions and the block ratio determines the mesophase structure. These organic-inorganic hybrids can have hexagonal morphology, but other morphologies such as lamellae, spheres, gyroids, and complex cubic structures such as bicontinuous double diamond are well-known (See, e.g., Yang, P., Zhao, D., Margolese, D. I., Chmelka, B. F. & Stucky, G. D. Generalized syntheses of large-pore mesoporous metal oxides with semicrystalline frameworks. Nature 396, 152 (1998)). The organics of the organic-inorganic hybrids are subsequently removed by heat treating (e.g., by calcining) in air to produce a mesoporous oxide structure. A disadvantage of this approach, however, is that the resulting mesoporous oxides cannot be heat treated to temperatures above about 400° C. without inducing the collapse of the mesoporous structure. As a result, rather than enabling mesoporous oxide structures having highly crystalline walls to be synthesized, soft templating is limited to the synthesis of mesoporous oxide structures having amorphous walls that have nanocrystals embedded therein.

Hard templating, on the other hand, utilizes inorganic precursors that are filled into pre-ordered hard mesoporous silica or replicated carbon templates, which are removed in a subsequent step (See, e.g., Jiao, F., et. al. Ordered mesoporous Fe2O3 with crystalline walls. J. Am. Chem. Soc. 128, 5468 (2006). It is often necessary to repeatedly add inorganic precursors in order to ensure that the pores are completely filled. Hard templating allows for heat treatment at elevated temperatures without structural collapse and, therefore, the synthesis of highly crystalline materials. By controlling the heat treatment temperature, either nanocrystals embedded in amorphous walls (~500° C.) or highly crystalline walls (600° C.) can be selectively fabricated (Jiao, F., et. al. Ordered mesoporous Fe2O3 with crystalline walls. J. Am. Chem. Soc. 128, 5468 (2006)). The disadvantage of hard templating, however, is that it is quite long and tedious since much effort and numerous steps are required to make the template (see, e.g., Lee, J., Kim, J. & Hyeon, T. Recent progress in the synthesis of porous carbon materials. Adv. Mater. 18, 2073 (2006)). A further disadvantage of hard templating is that the removal of the template can be cumbersome and often involves the use of hydrofluoric acid. Furthermore, it is difficult to completely fill the pores of the hard template, even when multiple-impregnation methods are used.

Therefore, a considerable drawback of utilizing either soft or hard templating for the synthesis of highly crystallized mesoporous metal oxides is that each process requires multiple, tedious steps and often only results in poor structure control. With respect to transition metals, it has been acknowledged that, to date, "[h]ighly crystallized mesoporous transition metal oxides with the original mesoporous structure have not been obtained spontaneously," i.e., in a simple "one-pot"-type procedure. (Shirokura, N., et. al. Synthesis of Crystallized Mesoporous Transition metal Oxides by Silicone Treatment of the Oxide Precursor. Chem. Commun. 20, 2188 (2006)). Hence, there is a need in the art for a simple, yet facile method for synthesizing highly crystalline metal oxide-carbon composites. In particular, there is a need for a simple, yet facile method for synthesizing highly crystalline transition metal oxide-carbon composites. There is also a need in the art for a simple, yet facile method that allows for the highly controlled and successful conversion of highly crystalline metal oxide-carbon composites to thermally stable mesoporous metal oxides, having highly crystalline mesopore walls, without causing the concomitant collapse of the mesostructure. Catalysis, electrocatalysis and sensing applications would particularly benefit from the availability of such mesoporous materials due to the greater surface-area and better accessibility of the metal.

Citation or identification of any reference in Section 2, or in any other section of this application, shall not be considered an admission that such reference is available as prior art to the present invention.

SUMMARY OF THE INVENTION

Highly crystalline metal oxide-carbon composites and methods of their synthesis are provided. A method for the conversion of the foregoing composites to thermally stable mesoporous metal oxides is also provided.

Highly crystalline metal oxide-carbon composites, having mesopores that are coated with a layer of amorphous carbon are provided.

A method is provided for the highly controlled conversion of highly crystalline metal oxide-carbon composites to thermally stable mesoporous metal oxides, having highly crystalline mesopore walls, without causing the concomitant collapse of the mesostructure.

A "one-pot" method is provided for the highly controlled and successful conversion of highly crystalline metal oxide-carbon composites to thermally stable mesoporous metal oxides, having highly crystalline mesopore walls, without causing the concomitant collapse of the mesostructure.

A "one-pot" method is provided that uses block copolymers with an sp or $sp^2$ hybridized carbon containing hydrophobic block as structure directing agents which converts to a sturdy, amorphous carbon material under appropriate heating conditions, providing an in-situ rigid support which maintains the pores of the oxides intact while crystallizing at temperatures as high as 1000° C.

In one embodiment, the methods of the present invention can comprise heating a highly crystalline metal oxide-carbon composite to produce a thermally stable mesoporous metal oxide consisting of a single polymorph.

In another method, the methods can further comprise heating the thermally stable mesoporous metal oxides to create a phase change from one polymorphic crystalline form to other polymorphic crystalline forms.

In particular, the thermally stable mesoporous transition metal oxide solids and methods of making the same are provided that incorporate transition metals.

BRIEF DESCRIPTION OF THE DRAWINGS

The present invention is described herein with reference to the accompanying drawings, in which similar reference characters denote similar elements throughout the several views.

FIG. 2 Materials characterization by X-ray. SAXS traces of the preferred embodiments, namely: a, mesostructured titanium oxide: as-made composite (A), $TiO_2$—C (B), $TiO_2$-CASH(C); b, mesostructured niobium oxide: as-made composite (A), $Nb_2O_5$—C (B), $Nb_2O_5$-CASH (C); Positions of higher order peaks suggest a hexagonal structure in all cases. Powder XRD pattern of: c, crystalline $TiO_2$: $TiO_2$—C (A), $TiO_2$-CASH (B); bar markers signify the peaks for anatase $TiO_2$ structure (PDF #21-1272); d, crystalline $Nb_2O_5$: $Nb_2O_5$—C (A), $Nb_2O_5$-CASH (B); bar markers signify the peaks for crystalline $Nb_2O_5$ structure (PDF #28-0371).

FIG. 4 Materials characterization the preferred embodiments by nitrogen physisorption. a, Nitrogen adsorption-desorption isotherms of $TiO_2$—C (A) and $TiO_2$-CASH (B) with inset showing corresponding pore size distributions of $TiO_2$—C (A) and $TiO_2$-CASH (B); b, Nitrogen adsorption-desorption isotherms of $Nb_2O_5$—C (A) and $Nb_2O_5$-CASH (B) with inset showing corresponding pore size distributions of $Nb_2O_5$—C (A) and $Nb_2O_5$-CASH (B). Pore size distributions were calculated based on the BJH method using the adsorption isotherm. Data are offset for B in both the isotherms and the insets showing the pore size distributions.

FIG. 5 Experimental evidence of in-situ carbon formation in the preferred embodiments, namely: a, Raman spectra of $TiO_2$—C (A) showing the characteristic carbon D & G bands and of $TiO_2$-CASH (B); b, TGA data of $TiO_2$—C (A) and $TiO_2$-CASH (B) in air.

FIG. 6 Electron Diffraction from Crystalline Materials of Preferred Embodiments, namely: a, Selected Area Electron Diffraction (SAED) pattern of $TiO_2$-CASH showing a sequence of diffraction rings consistent with what is expected for anatase $TiO_2$ (PDF #21-1272) as the crystal structure of the mesoporous material; b, Convergent Beam Electron Diffraction (CBED) pattern of $Nb_2O_5$-CASH showing a sequence of diffraction spots consistent with what is expected for crystalline $Nb_2O_5$ (the hkl planes for PDF #28-0371 are indicated by circles.

FIG. 14 Nitrogen adsorption-desorption data of the mesoporous $TiO_2$—C preferred embodiment, heat treated to 1000°

C. under Ar. Inset showing corresponding pore size distribution, calculated using adsorption isotherm and based on BJH method.

DETAILED DESCRIPTION OF THE INVENTION

Highly crystalline metal oxide-carbon composites and methods of their synthesis are provided. Use of the foregoing composites as precursors to thermally stable mesoporous metal oxides are also provided. Highly crystalline metal oxide-carbon composites, having mesopores that are coated with a layer of amorphous carbon are provided. A method is provided for the highly controlled conversion of highly crystalline metal oxide-carbon composites to thermally stable mesoporous metal oxides, having highly crystalline mesopore walls, without causing the concomitant collapse of the mesostructure. A "one-pot" method is provided for the highly controlled and successful conversion of highly crystalline metal oxide-carbon composites to thermally stable mesoporous metal oxides, having highly crystalline mesopore walls, without causing the concomitant collapse of the mesostructure. An embodiment of the "one-pot" method that is provided uses block copolymers with an sp or $sp^2$ hybridized carbon containing hydrophobic block as structure directing agents which converts to a sturdy, amorphous carbon material under appropriate heating conditions, providing an in-situ rigid support which maintains the pores of the oxides intact while crystallizing at temperatures as high as 1000° C. In one embodiment, the methods of the present invention can comprise heating a highly crystalline metal oxide-carbon composite to produce a thermally stable mesoporous metal oxide consisting of a single polymorph. In other embodiments, the methods can further comprise additional heating of the thermally stable mesoporous metal oxides to create a phase change from one polymorphic crystalline form to produce other polymorphic crystalline forms. In particular, the thermally stable mesoporous transition metal oxide solids and methods of making the same are provided that incorporate transition metals.

In certain embodiments, the present invention provides a "one-pot" method for the synthesis of well-organized, highly crystalline mesoporous metal oxides using amphiphilic copolymers as structure directing agents. In other embodiments, the present invention provides a "one-pot" method for the synthesis of well-organized, highly crystalline mesoporous metal oxides using a colloidal assembly of polystyrene beads, instead of amphiphilic copolymers, as the structure directing agents. The methods of the present invention each combine advantages of both soft structure directing assemblies and hard templating chemistries, and will therefore be referred to as combined assembly by soft and hard (CASH) chemistries or simply "CASH."

The preferred amphiphilic copolymers that are used as structure directing agents are amphiphilic diblock copolymers that contain a hydrophilic block and an sp or an $sp^2$ hybridized carbon containing hydrophobic block. Besides diblock copolymers (i.e., block copolymers that comprise two distinct types of monomers), it will be understood by those of skill in the art that the present invention may alternatively use triblock copolymers (i.e., block copolymers that comprise three distinct types of monomers) or higher block copolymers (i.e., those having more than three distinct types of monomers).

Examples of polymers that may be used in the hydrophobic block in the preferred copolymer include, but are not limited to, acrylates of $C_1$-$C_4$ alcohols, polymethacrylates of $C_3$-$C_4$ alcohols, and polyisoprene and/or polybutadiene.

Examples of polymers that may be used in the hydrophilic block in the preferred copolymer include, but are not limited to, polyethylene oxide, polyvinyl alcohols, polyvinylamines, polyvinylpyridines, polyacrylic acids, polymethacrylic acids, hydrophilic polyacrylates and amides, hydrophilic polymethacrylates and amides, and polystyrenesulfonic acids.

An embodiment of the block copolymer that can be used in the method of the present invention is poly(styrene)-b-poly(ethylene oxide). A more preferred embodiment of the block copolymer that can be used in the method of the present invention is poly(isoprene-block-ethylene oxide), PI-b-PEO, which is a block copolymer that has a very hydrophobic PI block and a very hydrophilic PEO block. Other block copolymers may be used as structure directing agents, such as, but not limited to: polystyrene-block-ethylene oxide, polystyrene-block-vinyl pyridine, and various block copolymers that contain a block of polyisoprene.

Figure 1:
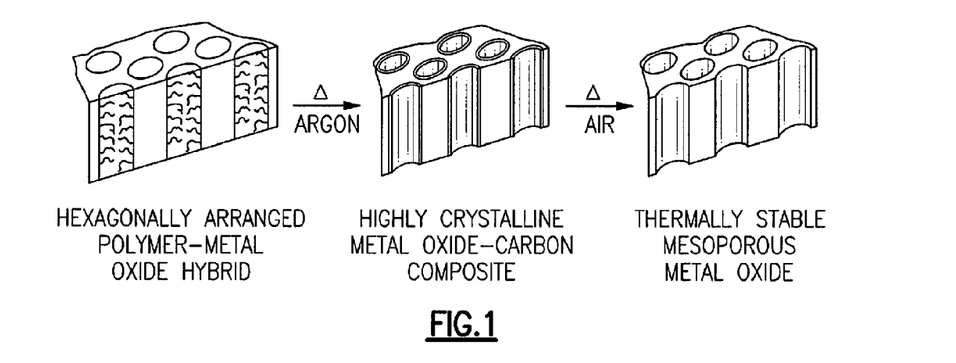
FIG. 1 is a schematic representation of an embodiment of the CASH method. In-situ formed carbon acts as a rigid support and allows for the synthesis of highly crystalline mesoporous metal oxides with large, uniform pores. The high degree of cylindrical order of the amorphous carbon depicted here was chosen for illustration purposes and is likely exaggerated. Although the particular embodiment shown indicates that the polymer-metal oxide hybrid is heated under an atmosphere of argon, any inert gas may be used.

Embodiments of the present invention may provide hybrid materials that are produced by combining amphiphilic copolymers with sols of transition metal oxides, which selectively swell the hydrophilic block of the block copolymer. The amphiphilic diblock copolymer of the preferred embodiment contains a hydrophilic block and an sp or an $sp^2$ hybridized carbon containing hydrophobic block, and acts as structure-directing agent. The methods of the present invention combine the advantages of both soft structure directing assemblies and hard templating chemistries, and is generally illustrated in FIG. 1. The embodiments titanium oxide, $TiO_2$, and niobium oxide, $Nb_2O_5$, are preferred because of their potential use in photovoltaic cells (Zukalova, M., et. al. Organized Mesoporous TiO2 Films Exhibiting Greatly Enhanced Performance in Dye-Sensitized Solar Cells. Nano Lett. 5, 1789 (2005)) and fuel cells (Drew, K., Girishkumar, G., Vinodgopal, K. & Kamat, P. V. Boosting Fuel Cell Performance with a Semiconductor Photocatalyst: TiO2/Pt—Ru Hybrid Catalyst for Methanol Oxidation. J. Phys. Chem. B. 109, 11851 (2005)), respectively, which overcomes previous limitations. The methods of the present invention give direct access to the desired materials in a "one-pot" synthesis using block copolymers with an sp or an $sp^2$ hybridized carbon containing hydrophobic block as structure directing agents which converts to a sturdy, amorphous carbon material under appropriate heating conditions. The synthesis of this in-situ carbon provides a method that is superior to the methods previously known in the prior art, because it is sufficient to act as a rigid support that keeps the pores of the oxides intact while crystallizing at temperatures as high as 1000° C.

The preferred block copolymer PI-b-PEO is well established as a model system for the study of mesoporous materials synthesis (see, e.g., Warren, S. C., DiSalvo, F. J. & Wiesner, U. Nanoparticle-tuned assembly and disassembly of mesostructured silica hybrids. Nat. Mater. 6, 156 (2007)). PEO is easily decomposed upon heating while the more thermally stable PI, containing two $sp^2$ hybridized carbons per monomer unit, is converted to a sturdy, amorphous carbon material when heat treated under an inert environment. Alternatively, it will be understood by those of skill in the art that block copolymers that contain one or more sp hybridized carbons per monomer unit would similarly be converted to a sturdy, amorphous carbon material when heat treated under an inert environment. The in-situ carbon of the highly crystalline metal oxide-carbon composite material of the present invention is sufficient to act as a rigid support to the mesostructured oxide walls, and prevents collapse when heat treated to temperatures required for obtaining highly crystalline metal oxide materials. The present invention's use of an sp or an $sp^2$ carbon containing hydrophobic block in the structure directing agent as the carbon source overcomes the disadvantages of the methods of the prior art, by eliminating the need for additional carbon precursors to be added to the synthesized mesoporous materials in preparation for the subsequent carbonization process. Because such additional carbon precursors typically resulted in the synthesized mesoporous materials having bimodal pore size distributions, mesoporous materials synthesized according to the present invention have substantially uniform pore sizes and are therefore superior to what is known in the prior art. A further advantage of the process of the present invention is that it has been shown to yield thermally stable mesoporous transition metal oxides that retain their original mesoporous structure, even after heat treatment to temperatures as high as 1000° C. (see below). Moreover, it will be understood by those of skill in the art that the method of the present invention is equally applicable to metal oxides that do not contain a transition metal. Therefore, highly crystalline mesoporous materials can be obtained through practice of the method of the present invention. Similar block copolymers have been used to make mesoporous crystalline metal oxides. In these cases, when the as-synthesized amorphous material was heat treated in air to low temperatures (~400° C.) (Brezesinski, T., Erpen, Iimura, C. K., Smarsly. B. Mesostructured Crystalline Ceria with a Bimodal Pore System Using Block Copolymers and Ionic Liquids as Rational Templates. Chem. Mater. 17, 1683 (2005)), the resulting materials have nanocrystalline patches in an amorphous matrix. In another approach, pre-synthesized crystalline $SnO_2$ nanoparticles were structure-directed via block copolymers to make relatively thermally stable, highly crystalline mesoporous $SnO_2$ (Ba, J., Polleux, J., Antonietti, M., Niederberger, M. Non-aqueous synthesis of tin oxide nanocrystals and their assembly into ordered porous mesostructures. Adv. Mater. 17, 2509 (2005)). However, this is a much more elaborate and complicated synthesis compared with the simple process that is disclosed herein. Furthermore, the prior art methods often first require the synthesis of small, near mono-disperse, crystalline metal oxide nanoparticles because the size of the nanoparticles should be below the radius of gyration of the PEO block (Warren, S. C., DiSalvo, F. J. & Wiesner, U. Nanoparticle-tuned assembly and disassembly of mesostructured silica hybrids. Nat. Mater. 6, 156 (2007)). This can be a major challenge, especially when extended to other metal oxides. The present invention provides a simple and viable approach to highly crystalline, mesoporous metal oxides.

According to one embodiment of the method of the present invention, a block copolymer is first dissolved in an appropriate solvent. The concentration of block copolymer that is used is limited only by the solubility of the particular block copolymer used and the appropriate solvent that is selected. For the preferred block copolymer, PI-b-PEO, appropriate solvents include but are not limited to dry THF or chloroform. For the preferred embodiment $TiO_2$, a concentration of around 10 wt % of PI-b-PEO can be used. For the preferred embodiment $Nb_2O_5$, a concentration of around 1 wt % of PI-b-PEO can be used. Next, a non-hydrolytic sol-gel route to the metal oxide (see Acosta, S., Corriu, R., Leclercq, D., Mutin, P. H. & Vioux, A. Novel non-hydrolytic sol-gel route to metal oxides. Journal of Sol-Gel Science and Technology 2, 25 (1994)) may be employed. In one embodiment, a metal chloride may be reacted with an alkoxide of the metal to form the metal oxide and corresponding alkyl halide. In the case of the $Nb_2O_5$ preferred embodiment, $NbCl_5$ reacts violently with THF and therefore, chloroform is preferably used as the solvent. The metal oxide sol selectively swells the hydrophilic PEO part of the block copolymer. Casting of the block copolymer/metal oxide solution in air and allowing the volatiles to evaporate results in an amorphous hybrid material. In the preferred embodiments, an inorganic to organic reactant mass ratio of about 2.00 for $TiO_2$ and about 1.45 for $Nb_2O_5$ leads to self-assembled hybrids with hexagonal morphology (see below), where hexagonally arranged PI cylinders are imbedded in a matrix containing a mixture of PEO and the metal oxide sol. The present invention is not limited to hexagonally arranged cylinders; those of skill in the art would recognize that other morphologies are possible and that the particular morphology achieved is a function of the volume fraction of hydrophilic to hydrophobic blocks of the block copolymer and the mass ratio of block copolymer to inorganic reactants that is used. To obtain highly crystalline materials, the as-made films may subsequently be heat treated under an inert atmosphere, such as argon or some other noble gas, to temperatures between about 450° C. and about 1000° C., but preferably around 700° C. for at least two hours. During this process, the hydrophilic portion of the block copolymer that forms a matrix with the metal oxide sol will be burnt off and metal oxide crystals will form. Referring to the preferred embodiment, PEO is burnt off and the metal oxide crystals nucleate, grow and sinter into wall material. At the same time, the hydrophobic part of the block copolymer is converted to an amorphous carbon that lines the walls of the resulting mesopores. Referring to the preferred embodiment, the sp or $sp^2$ hybridized carbon containing PI is converted to amorphous carbon that lines the walls of the cylindrical pores (see FIG. 1). The amorphous carbon can subsequently be removed by heating the material in air between about 250° C. to about 650° C. for a time ranging from about a few minutes up to about 100 hours. A preferable parameter is about 450° C., for at least 30 minutes. Optionally, water or other enhancers can be added to promote carbon oxidation. As a result, this process will leave a well-organized, highly crystalline mesoporous metal oxide behind.

The following is a typical procedure for synthesis of the mesoporous titanium dioxide compositions of the preferred embodiment. Equal molar amounts of titanium isopropoxide and titanium chloride (Sigma-Aldrich) were added to a solution of the polymer in THF. The ratio by mass of the inorganic reactants to polymer was 2.00. After stirring for more than five hours at room temperature, films were cast by evaporation of the solvent and byproducts in air on a hot plate at 50° C. and then at 130° C. in a vacuum oven for one hour. The particular inorganic to organic reactant mass ratio of 2.00 for $TiO_2$ led to self-assembled hybrids with hexagonal morphology, where hexagonally arranged PI cylinders are imbedded in a matrix containing a mixture of PEO and the metal oxide sol, but it is recognized that other morphologies can be attained when other reactant mass ratios are used. The as-synthesized amorphous material was heat treated using a 1° C./min ramp to 700° C. under argon and held for two hours or more resulting in crystallization of the amorphous metal oxide walls and conversion of the PI block of the block copolymer to amorphous carbon. As discussed above, during this process, PEO is burnt off and the metal oxide crystals nucleate, grow and sinter into wall material. At the same time, part of the PI is converted to an amorphous carbon that lines the walls of the resulting cylindrical pores. The carbon was removed by subsequent heat treatment using a 1° C./min ramp to 450° C. in air and held for two hours or more. According to this embodiment of the method of the present invention, a well organized, highly crystalline mesoporous transition metal oxide can be produced with relatively few steps and in a single-pot.

The typical procedure for synthesis of the mesoporous niobium oxide compositions of the preferred embodiment is similar to the synthesis described above for titanium oxide, except for the following principle differences. In an embodiment of the method of the present invention, the solvent used to synthesize mesoporous niobium oxide is preferably chloroform, and the inorganic precursors were preferably $NbCl_5$ and $Nb(OEt)_5$ (Sigma-Aldrich). The inorganic to organic reactants mass ratio in this case was 1.45. Two polymers of different molecular weights and PEO fractions were employed as structure directing agents for titanium and niobium oxide, respectively (see Table 1). For $TiO_2$, a PI-b-PEO was used with $M_n$=27,220 g/mol and 16.7 wt % PEO; for $Nb_2O_5$, a PI-b-PEO was used with $M_n$=33,500 g/mol and 23 wt % PEO. Both polymers were synthesized using anionic polymerization techniques resulting in narrow molecular-weight distributions with polydispersity indices of 1.02 and 1.03, respectively.

Materials Characterization

Table 1 below illustrates a comparison of the polymers and inorganic to organic reactant mass ratios used for the synthesis of mesoporous, crystalline $TiO_2$ and $Nb_2O_5$ wall thickness as determined from TEM images and the corresponding $d_{spacing}$'s of the as-synthesized, heat treated under argon and calcined in air materials, respectively as obtained from SAXS analysis.

TABLE 1

| | Polymer | | | Wall thickness from TEM images (nm) | | $D_{spacing}$ (nm) | | |
|---|---|---|---|---|---|---|---|---|
| | MW (g/mol) | Wt % of PEO | Inorganic:Organic mass ratio | $MO_x$-C | $MO_x$-SHIA | As-made | $MO_x$-C | $MO_x$-SHIA |
| $TiO_2$ | 27,220 | 16.7 | 2 | 9.6 | 7.8 | 31.4 | 27.4 | 24.1 |
| $Nb_2O_5$ | 33,500 | 23 | 1.45 | 10 | 5.6 | 29.9 | 27.3 | 26.1 |

The characterization of the as-made, heat treated under argon (MOx-C) and calcined in air (MOx-CASH) materials may be obtained from Small Angle X-Ray Scattering (SAXS), Transmission Electron Microscopy (TEM), Selected Area Electron Diffraction (SAED), Convergent Beam Electron Diffraction (CBED), Scanning Electron Microscopy (SEM), powder X-Ray Diffraction (XRD), Thermo-Gravimetric Analysis (TGA), Raman Spectroscopy and BET surface area analysis. While the methods of the present invention comprise distinct processing steps, each embodiment of the methods of the present invention can be carried out in a single dish or reaction container; beginning with the mixing of the precursors to the final product, hence the synthetic methods of the present invention are referred to as a "one-pot" syntheses.

Figure 2A:
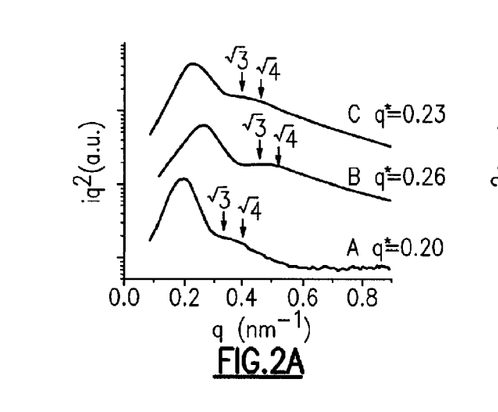
Figure 2B:
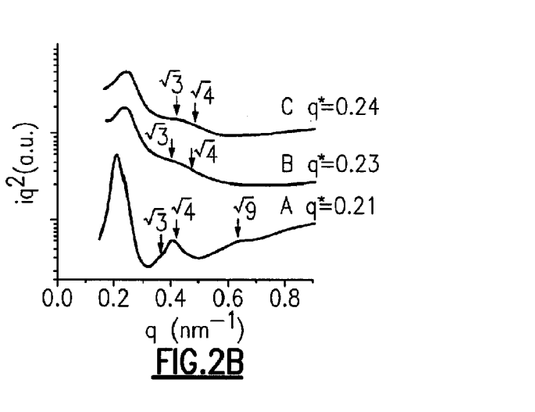

Results of SAXS experiments on $TiO_2$ and $Nb_2O_5$ preferred embodiments are depicted in FIG. 2a and b, respectively, and the corresponding spacings ($d_{spacing}$) are summarized in Table 1. The SAXS characterization of the as-made materials is suggestive of various degrees of order. For the as-synthesized $TiO_2$ preferred embodiment (FIG. 2a,A), a first order and a higher order peak are observed centered around values for the scattering wave vector, q, corresponding to $d_{spacing}$ of 31.4 nm and 16 nm, respectively (Table 1). The higher order peak is broad and unstructured which is typical for wormhole-like or short-range ordered hexagonal structures. In FIG. 2a and b, arrows indicate angular positions of √3 and √4 of the first order maximum expected for a hexagonally ordered structure. In the case of $Nb_2O_5$ preferred embodiment, the as-made material exhibits a SAXS pattern with more clearly distinguishable higher order reflections indicative of hexagonal long-range order (FIG. 2b,A). The main peak corresponds to a $d_{spacing}$ of 29.9 nm.

Figure 3:
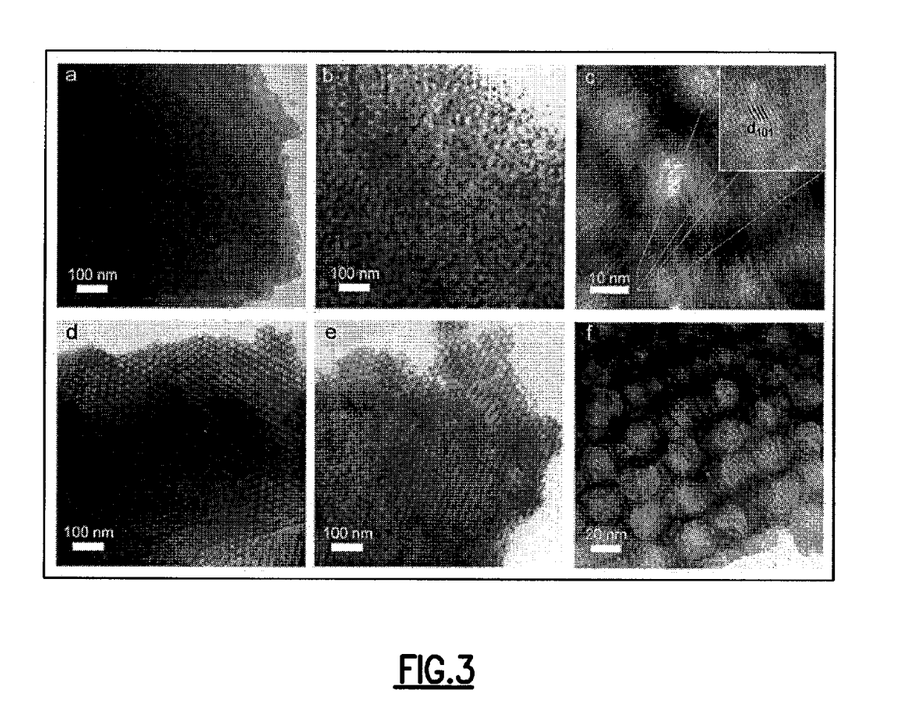
FIG. 3 Materials characterization by electron microscopy the preferred embodiments, namely: a, TEM image of as-made $TiO_2$; b, TEM image of $TiO_2$-CASH; c, High-Resolution TEM image of $TiO_2$-CASH; Inset: image showing $d_{101}$ spacing, $d_{101}$=3.48 Å, of the anatase structure consistent with literature values ($d_{101}$=3.52 Å from JCDPS); d, TEM image of as-made $Nb_2O_5$; e, TEM image of $Nb_2O_5$—C; f, TEM image of $Nb_2O_5$-CASH.

The structural assignments based on SAXS are corroborated by TEM experiments. TEM images of as-made $TiO_2$ preferred embodiment (FIG. 3a) show a wormhole-like structure reminiscent of three-dimensionally interconnected mesoporous silica developed by Pinnavaia and coworkers. TEM images of as-made $Nb_2O_5$ preferred embodiment confirm the well-ordered hexagonal arrangement of the mesopores (FIG. 3d).

Figure 2C:
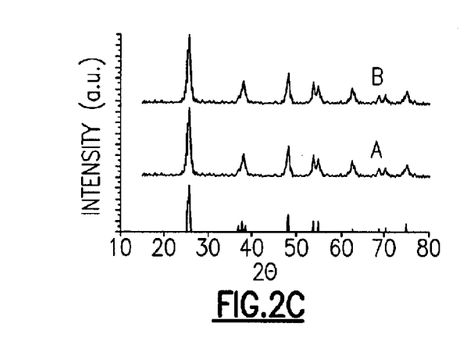
Figure 2D:
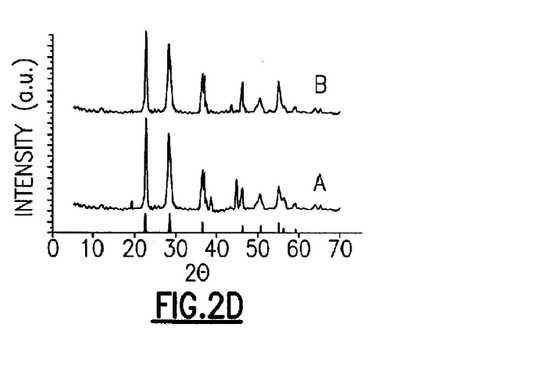
Figure 7:
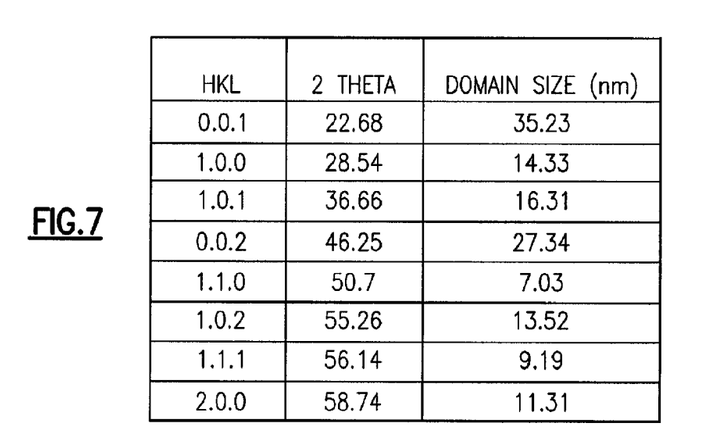
FIG. 7 Calculated domain sizes. Domain sizes as calculated using the Debye-Scherer equation of each 2-theta peak from the XRD pattern of the $Nb_2O_5$—C preferred embodiment and the corresponding hkl planes.

Heat treatment to 700° C. under Ar converted the as-made hybrids into mesoporous black composites of carbon and crystalline oxides. The formation of crystalline oxides is evident from XRD analysis of the resulting materials. As-made $TiO_2$ heat treated under Ar ($TiO_2$—C) shows several well-resolved, sharp peaks on a flat baseline (FIG. 2c,A) suggesting that the amorphous as-synthesized $TiO_2$ was successfully converted to a highly crystalline material. Comparing peak positions with crystallographic databases identifies the material as the anatase phase of $TiO_2$ (PDF #21-1272). The crystallite size as calculated from the Debye-Scherer equation is 10 nm. Similarly, the XRD pattern of $Nb_2O_5$—C (FIG. 2d,A) matched that of the hexagonal (primitive) $Nb_2O_5$ TT phase (PDF #28-0317) and also showed sharp peaks on a flat baseline. The domain size of the corresponding crystallites was calculated to be 35 nm along one hkl plane and on average 12 nm in other directions (see Supplementary Information, FIG. 7). Since the wall thickness of the mesoporous material is estimated to be ~10 nm (from a combination of pore diameter from BET data and d-spacing from SAXS analysis), this suggests that the $Nb_2O_5$ crystallites grew parallel to the pores.

SAXS characterization of the calcined, crystalline materials is again indicative of some degree of long-range order. Diffractograms of $TiO_2$—C show a first order peak with corresponding $d_{spacing}$ of 27.3 nm and a broad second order peak (FIG. 2a,B) similar to the as-made materials. Peaks are shifted to larger q values, however, due to shrinkage upon removal of the organics. The corresponding reduction in characteristic spacing of only about 14% already supports the notion that a carbon layer prevents severe contraction of the mesostructures upon calcinations (in reference 11, even though the material was only calcined under air to 400° C., the contraction was 24%, and in earlier studies on aluminosilicate mesostructure formation with PI-b-PEO the contraction was as large as 33%). Likewise, for $Nb_2O_5$—C, the first order peak is shifted to a larger q value with corresponding $d_{spacing}$ of approximately 27.3 nm (FIG. 2b,B). In this case, however, the higher order peaks are not as distinct as they were in the corresponding as made material.

Figure 9:
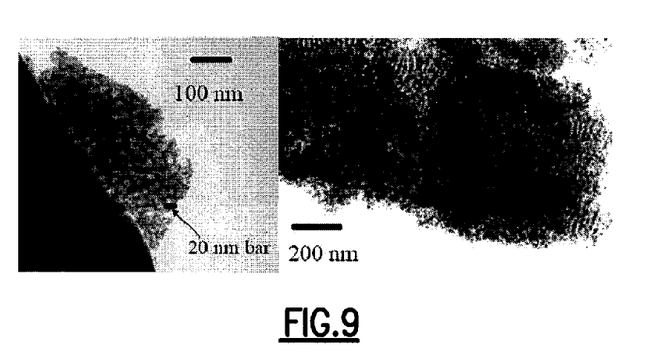
FIG. 9 TEM images of the $TiO_2$—C preferred embodiment. The as-synthesized preferred embodiment was heat treated under argon at 700° C.
Figure 10:
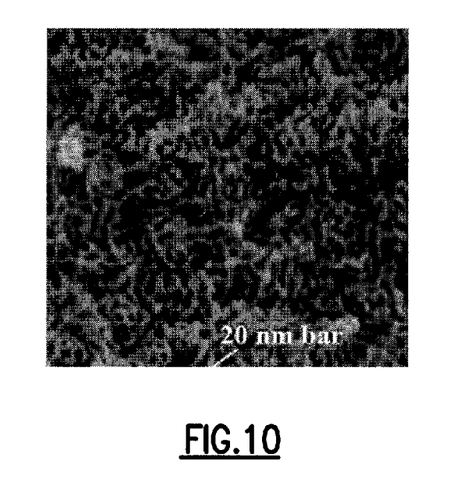
FIG. 10 SEM image of $TiO_2$-CASH preferred embodiment. In order to obtain this sample $TiO_2$—C was calcined in air at 450° C.

The mesoporous nature of the crystallized materials is confirmed by nitrogen physisorption. $TiO_2$—C exhibits a type VI nitrogen sorption isotherm (FIG. 4a,A) with specific surface area of 75 $m^2/g$. The sharp adsorption at ~0.9 $P/P_0$ indicates that uniform large pores are dominant. The pore size estimate based on the Barrett-Joyner-Halenda (BJH) method is 23.6 nm (FIG. 4a,A inset), in agreement with pore size estimates from TEM and SEM images (see Supplementary Information, FIGS. 9 & 10). Similarly, $Nb_2O_5$—C exhibits a type VI nitrogen sorption isotherm (FIG. 4b,A) with specific surface area of 69 $m^2/g$. The pore size estimate based on the Barrett-Joyner-Halenda (BJH) method is 24 nm (FIG. 4b,A inset), also in agreement with analysis of microscopy (TEM) images (see FIG. 3e).

Figure 5A:
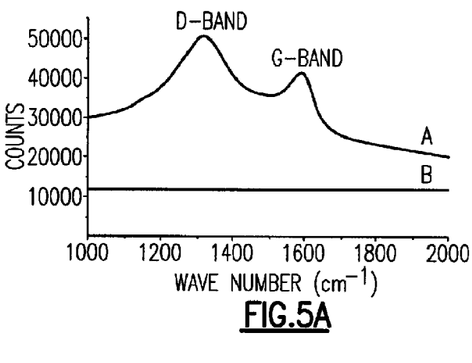
Figure 5B:
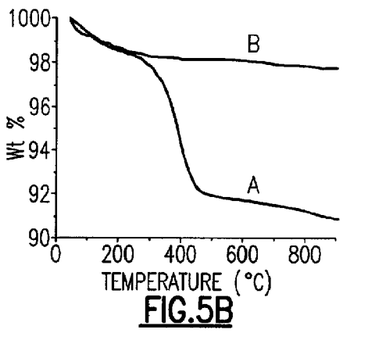
Figure 11:
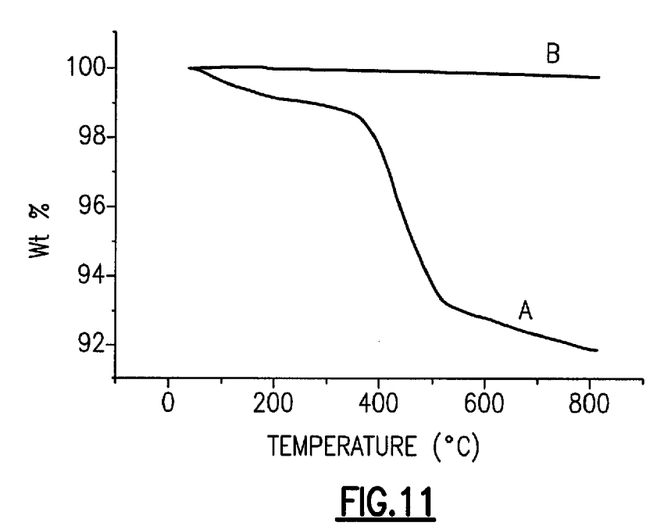
FIG. 11 TGA data of the $Nb_2O_5$—C (A) and $Nb_2O_5$-CASH preferred embodiments in air.

Raman spectroscopy was used to establish the presence of the in-situ formed carbon and its removal in the final material. A representative spectrum for a $TiO_2$ material heat treated under argon to 700° C. is shown in FIG. 5a,A. Two bands appear around 1600 $cm^{-1}$ and 1350 $cm^{-1}$ from graphitic carbon (G-band) and disordered carbon (D-band), respectively. This type of Raman spectrum is typical for amorphous carbon materials. Upon subsequent calcination in air at 450° C., the materials became white and Raman spectroscopy shows that the two bands disappeared (FIG. 5a,B). Finally, removal of carbon was corroborated using TGA (FIG. 5b). For $TiO_2$—C (the material heated in argon), a subsequent TGA run in air shows a significant weight loss (about 8%) that occurs around 400° C. from the oxidation of carbon in the pore walls to CO or $CO_2$ (see FIG. 5b,A). As expected, there is no such weight loss from samples that are heated to 450° C. in air (MOx-CASH) prior to the TGA measurement (see FIG. 5b,B). TGA on $Nb_2O_5$ showed similar results (see Supplementary Information, FIG. 11).

Figure 6A:
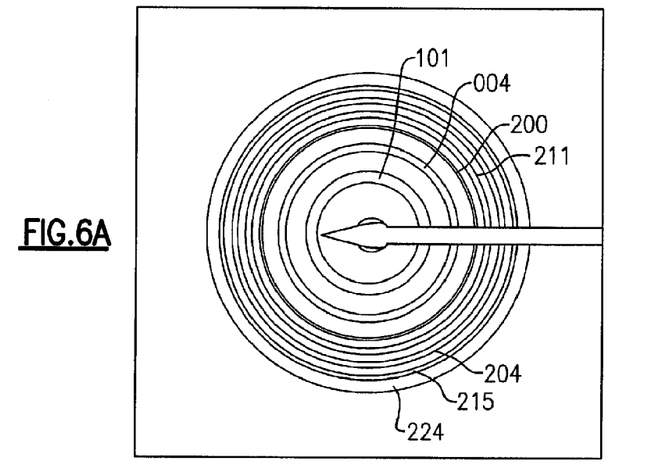

Heat treatment in air at 450° C. thus removed the carbon from the crystalline mesoporous metal-oxide/carbon composites, leaving only the highly crystalline mesoporous metal-oxides. Subsequent characterization showed that crystallinity and ordering of the parent materials were preserved. XRD analysis confirms the presence of both crystalline $TiO_2$ and crystalline $Nb_2O_5$, see FIGS. 2c,B and 2d,B, respectively. Crystallite sizes estimated from the Debye-Scherer equation showed no changes over the parent materials. Representative high resolution TEM imaging (FIG. 3c) and selected area electron diffraction patterns (SAED, FIG. 6a) of various local sections of $TiO_2$-CASH confirms that the walls are indeed highly crystalline and that anatase is the crystalline form as suggested by the XRD pattern. The degree of order was retained for both samples as was verified by SAXS. For $TiO_2$-CASH, with removal of carbon, first order and higher-order peaks are further shifted to larger q values ($d_{spacing}$ of 24.1 nm) as compared to the material heated under argon ($d_{spacing}$ of 27.4 nm, see FIG. 2a,C). This slight shrinkage of the material offsets the expected increase in pore size from the removal of the carbon lining the walls of the pores, therefore the pore size was relatively unchanged (see below). Retention of the structure was also corroborated by TEM, see FIG. 3b. For $Nb_2O_5$-CASH, SAXS (FIG. 2b,C) and TEM (FIG. 3f) also confirmed that the ordering of the parent material was preserved after the second heat treatment and convergent beam electron diffraction patterns (CBED, FIG. 6b) of various local sections confirm that the walls are indeed highly crystalline. Interestingly, for this material the $d_{spacing}$ stayed approximately the same, compare FIGS. 2b,B and 2b, C.

Figure 6B:
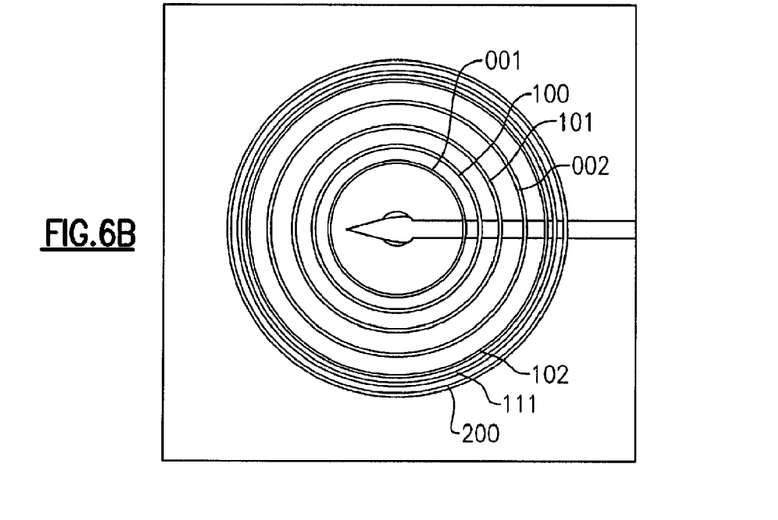

Since, $Nb_2O_5$ has a lower melting point than $TiO_2$ (1520° C. compared to 1870° C.), heat treatment to high temperatures resulted in larger crystallite sizes (35 nm oblong-shaped) than for $TiO_2$ (10 nm). This is evident from electron diffraction analysis as one can obtain diffraction spots for the crystalline $Nb_2O_5$-CASH with CBED (much smaller beam size as compared to SAED) rather than diffraction rings (as seen for $TiO_2$-CASH with SAED, compare FIGS. 6a & b, respectively). The large crystallites may have prevented further condensation during the second heat treatment to remove the carbon and, hence, $d_{spacing}$ and the hexagonal order of the mesopores are retained.

Figure 4A:
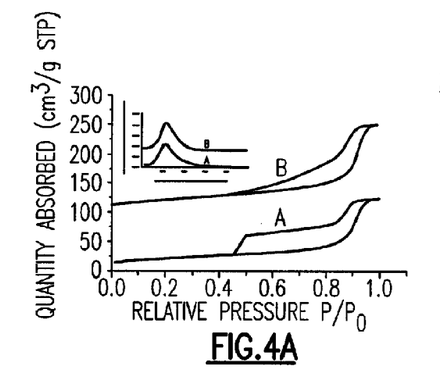
Figure 4B:
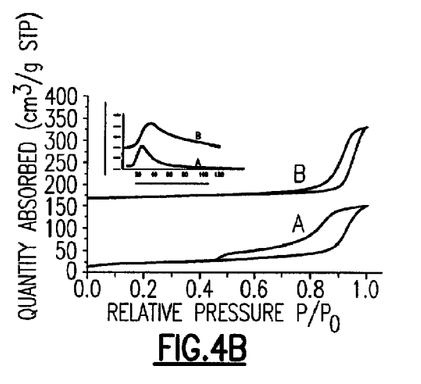

BET measurements confirm that the mesoporosity of the materials is also retained after removal of the in-situ carbon. For $TiO_2$-CASH, the nitrogen sorption isotherm showed a sharp adsorption at ~0.9 $P/P_0$ and analysis revealed an average pore size of 22.9 nm, very similar to the results on $TiO_2$—C already discussed (FIG. 4a,B). The pore size distributions before and after removal of carbon were almost unchanged (compare data in the inset of FIG. 4a). At the same time the surface area slightly increased from 75 to 89 $m^2/g$. From a combination of data from SAXS and BET analysis, the wall thickness of $TiO_2$-CASH is estimated to be about 7.5 nm, calculated based on a hexagonally ordered structure, while the thickness estimated from TEM analysis is about 9-10 nm. The 10 nm crystallite size of the $TiO_2$-CASH obtained from the (101) anatase peak of the XRD pattern is thus the same or slightly larger than the wall thickness. This suggests that the walls are highly crystallized rather than consisting of nanocrystalline material embedded in amorphous walls. Similar results were described when employing the hard templating pathway. The same can be said for $Nb_2O_5$-CASH as the average crystallite size (35 nm in one plane and 12 nm in other planes) is much larger than the estimated wall thickness (6 nm). In the case of $Nb_2O_5$-CASH, i.e., after removal of the carbon, BET analysis suggested a slight decrease in surface area from 69 to 54 $m^2/g$, with a pore size increase from 24 to 34.5 nm (FIG. 4b,B) and an increase in pore size distribution, compare data in the inset of FIG. 4b. This is expected with the removal of the carbon lining the walls of the pores coupled with no further shrinkage of the material. To verify this, analysis of TEM images suggested that the wall thickness had indeed decreased after removal of the carbon lining the walls (FIG. 3f).

Figure 12:
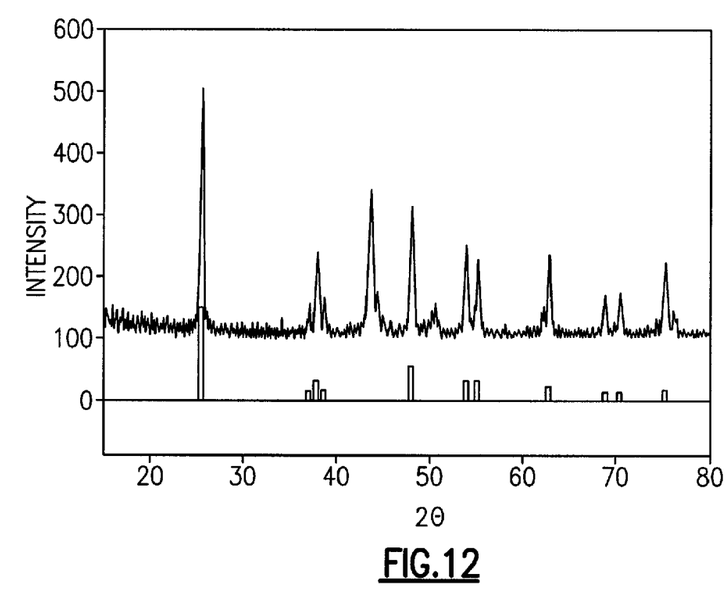
FIG. 12 Powder XRD pattern of the $TiO_2$ preferred embodiment obtained by direct calcination of as-synthesized $TiO_2$ in air to 700° C. Bar markers signify the peaks for anatase $TiO_2$ structure preferred embodiments (PDF #21-1272).
Figure 13:
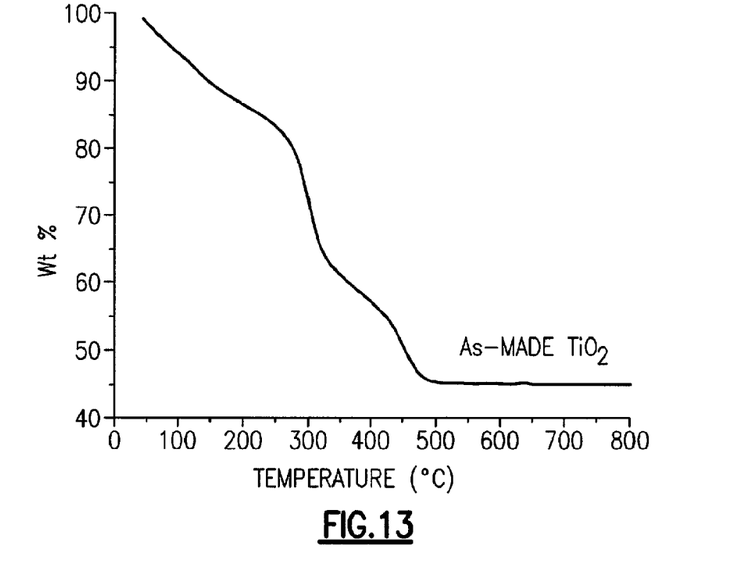
FIG. 13 TGA of as-synthesized mesostructured $TiO_2$ preferred embodiment in air.
Figure 14:
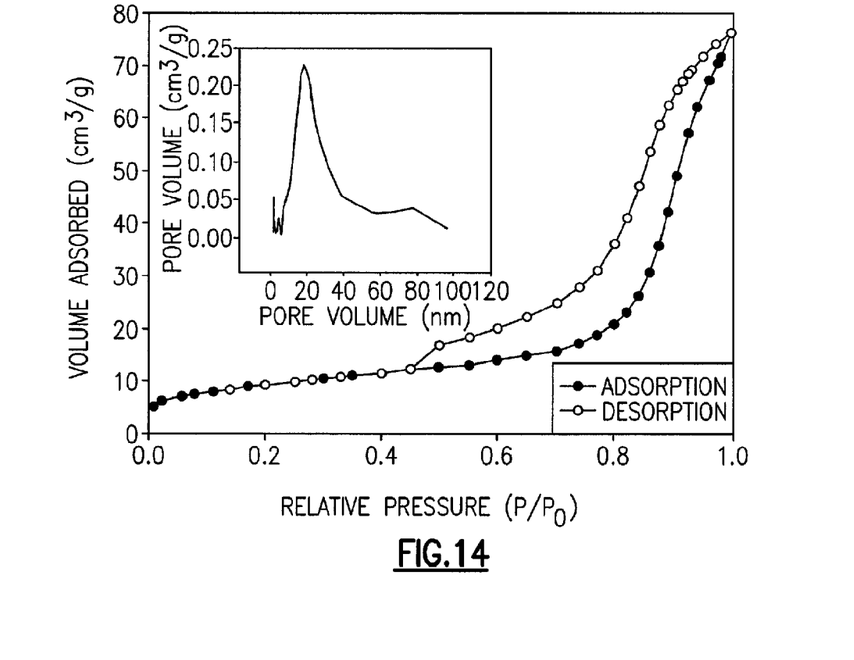
Figure 15:
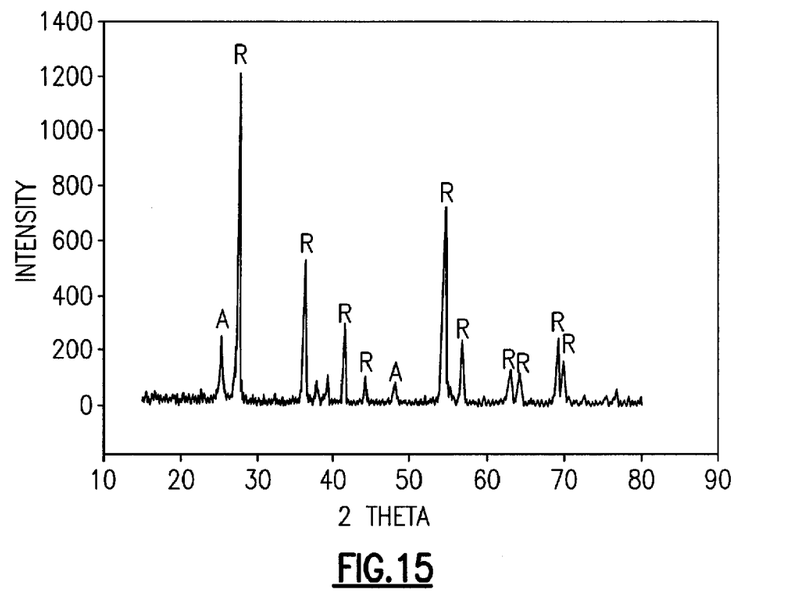
FIG. 15 Powder XRD pattern of the mesoporous $TiO_2$—C preferred embodiment, heat treated at 1000° C. under Ar. A and R indicate anatase and rutile peaks, respectively.
Figure 16:
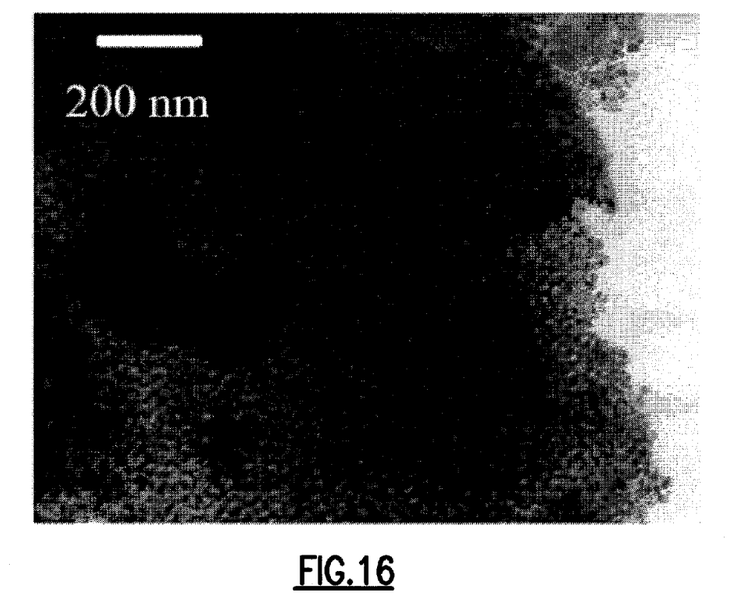
FIG. 16 TEM image of the mesoporous $TiO_2$—C preferred embodiment, heat treated at 1000° C. under Ar. This image shows wormhole-like uniform pores.

In order to elucidate the importance of the role of in-situ formed carbon in the formation of well-organized, highly crystalline mesoporous metal oxides, the as synthesized $TiO_2$ preferred embodiment was directly calcined under air to 700° C. while keeping all other conditions the same as for the CASH method. As expected, the BET surface area of the resulting material was only 0.2 $m^2/g$ and no porous structure could be detected by TEM imaging. This implies that the mesostructure completely collapsed. The crystallite size of this sample, heat treated to 700° C. in air is 31.5 nm (calculated from XRD pattern, see Supplementary Information, FIG. 12), which is much larger than that of our sample heat treated to 700° C. under argon (10 nm). All the organics from the structure directing block copolymer PI-b-PEO are removed under air below 500° C. (see TGA data in Supplementary Information, FIG. 13) and further crystallization without any carbon support causes collapse of the pores. In contrast, when the as-made $TiO_2$ was heated to temperatures as high as 1000° C. under argon (i.e., prepared by the CASH method), the black color and mesoporosity were preserved. The pore size and surface area of $TiO_2$—C in this instance were 17.4 nm and 29 $m^2/g$, respectively (see Supplementary Information, FIG. 14). For these annealing conditions the walls of the mesopores are composed of a mixture of anatase and rutile crystals as anatase is usually converted to rutile above 700° C. (see Supplementary Information, FIG. 15). Reduction in pore size and surface area, relative to the material heated to only 700° C., can be rationalized considering the changes in crystal structure occurring at such extreme temperatures, which are expected to have an effect on structural characteristics of the resulting material. Most importantly, however, even for this very high temperature the porosity of the material was retained (see also TEM image in Supplementary Information, FIG. 16), further demonstrating the efficiency of the CASH method.

Figure 8:
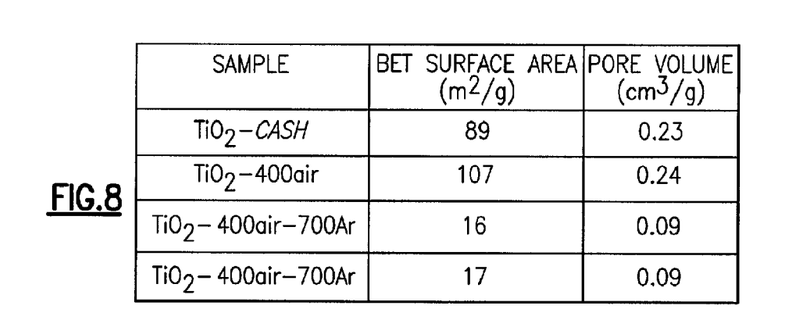
FIG. 8 Surface area and pore volume data from BET analysis of the $TiO_2$ preferred embodiment samples heat treated in various ways.
Figure 17:
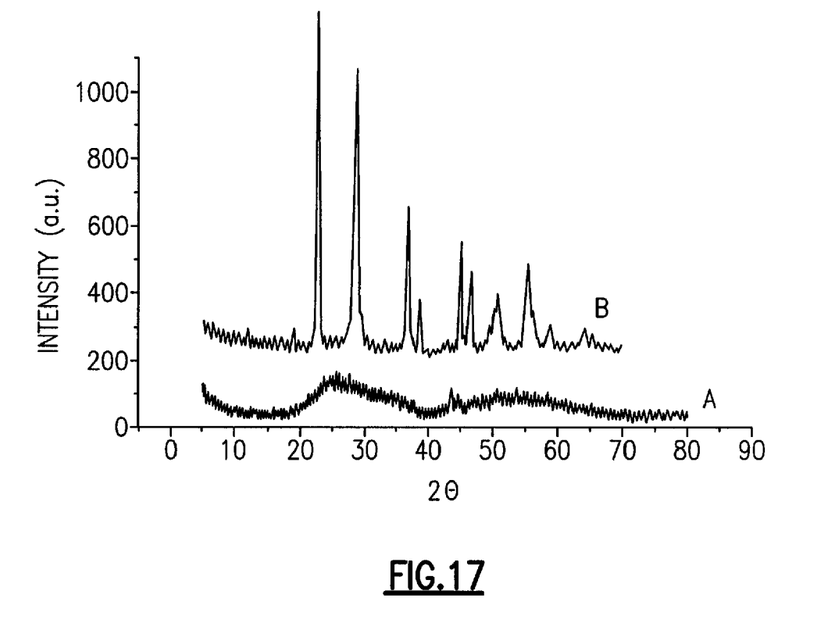
FIG. 17 Powder XRD data at different heating conditions. XRD pattern of preferred embodiments: as-made $Nb_2O_5$ heat treated to 400° C. in air (A) and to 700° C. under Ar (B).

Finally, to show the versatility of our method in terms of achieving highly crystalline, mesoporous metal-oxides and the importance of heat treating to high temperatures, as-made $TiO_2$ and $Nb_2O_5$ preferred embodiments were heat treated to 400° C. in air, like most reported work using soft-templating methods suggest. For $TiO_2$, the material was subsequently heat treated to 700° C. both under Ar and in air. The results from nitrogen physisorption experiments on these two materials clearly show that the structure had collapsed (see Supplementary Information, FIG. 8). This corroborates both the importance of the in-situ carbon and also that between 400° C. and 700° C. further changes (crystallization) occur in the walls of the material, supporting the notion that higher temperatures lead to highly crystalline materials. For $Nb_2O_5$, the resulting XRD pattern of the material heat treated to 400° C. in air reveals that the material is still amorphous (see Supplementary Information, FIG. 17A). $Nb_2O_5$ is crystallized at a higher temperature than 400° C. but most previous methods only allow heat treatment to this temperature before the mesostructure collapses. Therefore, the CASH method facilitates the synthesis of highly crystalline (see Supplementary Information, FIG. 17B), mesoporous $Nb_2O_5$ by virtue of heat treating to a temperature as high as 700° C. under an inert atmosphere. This simple, yet facile method can therefore be utilized to obtain highly crystalline, mesoporous metal oxides through high temperature heat treatments that were otherwise not possible without collapse of the mesostructure.

SAXS experiments were performed on the G1 station at CHESS for $Nb_2O_5$ and on a Rigaku RU—H3R copper rotating anode ($\lambda$=1.54 Å) for $TiO_2$. XRD data were obtained from powdered samples using a Scintag Inc. q-q diffractometer (CuK$\alpha$, 1.54 Å). TEM on a JEOL 1200 EX at 120 kV was used to capture images in FIGS. 3$a$, $b$ & d. HRTEM on a FEI Tecnai F20 TEM at 200 kV was used to capture the image in FIG. 3$c$ while a FEI Tecnai T12 TEM at 120 kV was used to capture images in FIG. 3$e$ & $f$. Raman data was collected on a Renishaw InVia microRaman system. TGA was performed on a TG/DTA 320 (heating rate: 5° C./min). Nitrogen adsorption/desorption isotherms were measured at −196° C. by using a Micromeritics ASAP 2020 system. The samples were degassed at 150° C. overnight on a vacuum line.

In another embodiment of the invention rather than forming a carbonaceous material upon heating, the hydrophobic block is chosen such that it disintegrates into another inorganic/ceramic material. In this embodiment the inorganic material plays the same role as the carbonaceous material formed from sp or sp2 hybridized carbon containing hydrophobic blocks, i.e. it will act as a scaffold to keep the structure intact upon crystallization of the transition metal oxide. At the same time this embodiment leads to the formation of a nanostructured inorganic/ceramic-transition metal oxide composite which in of itself can be of value. Examples for such hydrophobic blocks include but are not limited to polynorbornene-decarborane which transforms under heat into boron carbonitride and boron nitride and polysilazanes which transform under heat into silicon carbonitride and silicon carbide.

The present invention is not limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety and for all purposes to the extent as if each individual publication, patent, or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

While the present invention has been particularly shown and described with reference to the preferred mode as illustrated in the drawing, it will be understood by one skilled in the art that various changes in detail may be effected therein without departing from the spirit and scope of the invention as defined by the claims.

We Claim:

1. A method for preparing a thermally stable crystalline mesoporous metal oxide comprising the steps of:
    (a) providing a block copolymer/metal oxide solution, wherein the block copolymer comprises a hydrophobic portion comprising sp or sp2 hybridized carbon atoms in each monomer unit, or
    providing a colloidal assembly of polystyrene beads/metal oxide, wherein the polystyrene beads comprise a hydrophobic portion comprising sp or sp2 hybridized carbon atoms in each monomer unit;
    (b) casting the solution or the colloidal assembly in air resulting in the formation of a polymer metal oxide hybrid;
    (c) heating the polymer metal oxide hybrid in an inert atmosphere to a temperature of about 700° C. for at least 2 hours resulting in the formation of a porous crystalline metal oxide-carbon composite; and
    (d) following the heating step, removing the carbon by heating the composite in air, resulting in the formation of a thermally stable mesoporous metal oxide.

2. A thermally stable mesoporous metal oxide produced by the method of claim 1.

3. A method for preparing a thermally stable crystalline mesoporous metal oxide comprising the steps of:
    (a) providing a block copolymer/metal oxide solution, wherein the block copolymer comprises a hydrophobic portion comprising sp or sp2 hybridized carbon atoms in each monomer unit, or
    providing a colloidal assembly of polystyrene beads/metal oxide, wherein the polystyrene beads comprise a hydrophobic portion comprising sp or sp2 hybridized carbon atoms in each monomer unit;
    (b) casting the solution or the colloidal assembly in air resulting in the formation of a polymer-metal oxide hybrid;
    (c) heating the polymer metal oxide hybrid in an inert atmosphere to a temperature of about 700° C. for at least 2 hours resulting in the formation of a porous crystalline metal oxide-carbon composite; and
    (d) following the heating step, removing the carbon by heating the composite in air at a temperature in the range of about 400° C. to 700° C. for a time sufficient to result in the formation of a thermally stable mesoporous metal oxide.

4. A method for preparing thermally stable crystalline mesoporous metal oxide comprising the steps of:
(a) providing a block copolymer/metal oxide solution, wherein the block copolymer comprises a hydrophobic portion comprising sp or sp2 hybridized carbon atoms in each monomer unit, or
providing a colloidal assembly of polystyrene beads/metal oxide, wherein the polystyrene beads comprise a hydrophobic portion comprising sp or sp2 hybridized carbon atoms in each monomer unit;
wherein the metal oxide comprises a metal oxide selected from the group consisting of a Group IV oxide and a Group V oxide;
(b) casting the solution or the colloidal assembly in air resulting in the formation of a polymer-metal oxide hybrid;
(c) heating the polymer metal oxide hybrid in an inert atmosphere to a temperature of about 700° C. for at least 2 hours resulting in the formation of a porous crystalline metal oxide-carbon composite; and
(d) following the heating step, removing the carbon by heating the composite in air, resulting in the formation of a thermally stable mesoporous metal oxide.

5. The method of claim 4 in which the metal oxide is selected from the group consisting of $TiO_2$ and $Nb_2O_5$.

6. The method of claim 4 in which the resulting thermally stable mesoporous metal oxide consists of a single polymorph.

7. A method for preparing thermally stable crystalline mesoporous metal oxide comprising the steps of:
(a) providing a block copolymer/metal oxide solution, wherein the block copolymer comprises a hydrophobic portion comprising sp or sp2 hybridized carbon atoms in each monomer unit, or
providing a colloidal assembly of polystyrene beads/metal oxide, wherein the polystyrene beads comprise a hydrophobic portion comprising sp or sp2 hybridized carbon atoms in each monomer unit;
(b) casting the solution or the colloidal assembly in air resulting in the formation of a polymer-metal oxide hybrid;
(c) heating the polymer-metal oxide hybrid in an inert atmosphere to a temperature of about 700° C. for at least 2 hours resulting in the formation of a porous crystalline metal oxide-carbon composite; and
(d) following the heating step, removing the carbon by heating the composite in air at a temperature in the range of about 400° C. to 700° C. for a time sufficient to result in the formation of a thermally stable mesoporous metal oxide.

8. A method for preparing a thermally stable mesoporous titanium oxide comprising the steps of:
(a) providing a block copolymer/titanium oxide solvent solution, wherein the block copolymer comprises a hydrophobic portion comprising sp or sp2 hybridized carbon atoms in each monomer unit, or
providing a colloidal assembly of polystyrene beads/titanium oxide, wherein the polystyrene beads comprise a hydrophobic portion comprising sp or sp2 hybridized carbon atoms in each monomer unit;
(b) casting the solution or the colloidal assembly in air resulting in the formation of a polymer-titanium oxide hybrid;
(c) heating the polymer-titanium oxide hybrid in an inert atmosphere at a temperature of about 700° C. for at least 2 hours resulting in crystallization of the titanium oxide and conversion of the block copolymer to amorphous carbon; and
(d) following the heating step, removing the carbon by heating in air at about 400° C. to 700° C. resulting in the formation of a thermally stable mesoporous titanium oxide.

9. The method of claim 8 in which the resulting thermally stable mesoporous metal oxide consists of a single polymorph.

10. A thermally stable mesoporous titanium oxide produced by the method of claim 8.

11. A method for preparing a thermally stable mesoporous niobium oxide comprising the steps of:
(a) providing a block copolymer/niobium oxide solution, wherein the block copolymer comprises a hydrophobic portion comprising sp or sp2 hybridized carbon atoms in each monomer unit, or
providing a colloidal assembly of polystyrene beads/niobium oxide, wherein the polystyrene beads comprise a hydrophobic portion comprising sp or sp 2 hybridized carbon atoms in each monomer unit;
(b) casting the solution or the colloidal assembly in air resulting in the formation of a polymer-metal niobium oxide hybrid;
(c) heating the polymer-niobium oxide hybrid in an inert atmosphere at a temperature of about 700° C. for at least 2 hours resulting in crystallization of the niobium oxide and conversion of the block copolymer to amorphous carbon; and
(d) following the heating step, removing the carbon by heating in air at about 400° C. to 700° C. resulting in the formation of a thermally stable mesoporous niobium oxide.

12. The method of claim 11 in which the resulting thermally stable mesoporous metal oxide consists of a single polymorph.

13. A thermally stable mesoporous niobium oxide produced by the method of claim 11.

14. A method for preparing a thermally stable crystalline mesoporous transition metal oxide comprising the steps of:
(a) providing a block copolymer/transition metal oxide solution , wherein the block copolymer comprises a hydrophobic portion comprising sp or sp2 hybridized carbon atoms in each monomer unit, or
providing a colloidal assembly of polystyrene beads/transition metal oxide, wherein the polystyrene beads comprise a hydrophobic portion comprising sp or sp2 hybridized carbon atoms in each monomer unit;
(b) casting the solution or the colloidal assembly in air resulting in the formation of a polymer-transition metal oxide hybrid;
(c) heating the polymer-transition metal oxide hybrid in an inert atmosphere to a temperature of about 700° C. for at least 2 hours resulting in the formation of a porous crystalline transition metal oxide-carbon composite; and
(d) following the heating step, removing the carbon by heating the composite in air, resulting in the formation of a thermally stable mesoporous transition metal oxide.

15. A thermally stable mesoporous transition metal oxide produced by the method of claim 14.

16. A method for preparing a crystalline metal oxide-carbon composite comprising the steps of:

(a) providing a block copolymer/metal oxide solution wherein the block copolymer comprises a hydrophobic portion comprising sp or sp2 hybridized carbon atoms in each monomer unit, or providing a colloidal assembly of polystyrene beads/metal oxide, wherein the polystyrene beads comprise a hydrophobic portion comprising sp or sp2 hybridized carbon atoms in each monomer unit;

(b) casting the solution or the colloidal assembly in air resulting in the formation of a polymer-metal oxide hybrid; and (c) heating the polymer metal oxide hybrid in an inert atmosphere to a temperature of about 700° C. for at least 2 hours resulting in the formation of a porous crystalline metal oxide-carbon composite in which an amorphous carbonaceous material lines the walls of the resulting mesopores.

17. The product formed by the method of claim 16.

18. A method for preparing a nanostructured inorganic/ceramic-transition metal oxide composite comprising the steps of:

(a) providing a block copolymer/metal oxide solution wherein the block copolymer comprises a hydrophobic portion which transforms upon heating into an inorganic/ceramic, or providing a colloidal assembly of polystyrene beads/metal oxide, wherein the polystyrene beads comprise a hydrophobic portion which transforms upon heating into an inorganic/ceramic;

(b) casting the solution or the colloidal assembly in air resulting in the formation of a polymer-metal oxide hybrid; and (c) heating the polymer metal oxide hybrid in an inert atmosphere to a temperature of about 700° C. for at least 2 hours resulting in the formation of a nanostructured inorganic/ceramic-transition metal oxide composite.

19. The product formed by the method of claim 18.

\* \* \* \* \*